United States Patent [19]

Nishii

[11] Patent Number: 4,630,525
[45] Date of Patent: Dec. 23, 1986

[54] VACUUM BOOSTER ASSEMBLY

[75] Inventor: Michiharu Nishii, Toyota, Japan

[73] Assignee: Aisin Seiki Kabushiki Kaisha, Kariya, Japan

[21] Appl. No.: 716,205

[22] Filed: Mar. 26, 1985

[30] Foreign Application Priority Data

Mar. 29, 1984 [JP] Japan ............................ 59-045589[U]

[51] Int. Cl.⁴ .............................................. F15B 9/10
[52] U.S. Cl. ..................... 91/369 A; 92/99; 92/169
[58] Field of Search ............ 92/98 D, 165 PR, 169.2, 92/169.3, 169.4, 99; 91/369 A

[56] References Cited

U.S. PATENT DOCUMENTS

| 4,270,438 | 6/1981 | Thomas | 92/169.3 |
| 4,271,750 | 6/1981 | Thomas | 92/169.3 |
| 4,339,921 | 7/1982 | Schanz | 92/169.3 |
| 4,377,069 | 3/1983 | Kobayashi | 92/169.2 |

FOREIGN PATENT DOCUMENTS

| 2031086 | 4/1980 | United Kingdom | 92/169.4 |
| 2069638 | 8/1981 | United Kingdom | 92/169.4 |
| 2082704 | 3/1982 | United Kingdom | 92/169.2 |
| 2087498 | 5/1982 | United Kingdom | 92/169.2 |

Primary Examiner—Abraham Hershkovitz
Attorney, Agent, or Firm—Oblon, Fisher, Spivak, McClelland & Maier

[57] ABSTRACT

A vacuum booster assembly comprises front and rear shells of pressed sheet metal coupled to each other at their annular opening end portions, a power piston housed within the coupled shells, a diaphragm member attached to a pressure receiving portion of the power piston and having an outer annular bead clamped between the annular opening end portions of the shells, an inner annular bead coupled over a cylindrical portion of the power piston, a flexible portion extending along the contour of the pressure receiving portion of the power piston, and a pair of support portions formed to correspond with a pair of radial recesses formed in the pressure receiving portion of the power piston, a pair of support members attached to the support portions of the diaphragm member in such a manner to permit axial movement of the power piston, and a pair of tie bars extending in parallel respectively across the front shell, the support member, the support portion of the diaphragm member and the rear shell and fastened at opposite ends thereof to the front and rear shells to clamp the support portions of the diaphragm member between the support members and the rear shell.

4 Claims, 4 Drawing Figures

VACUUM BOOSTER ASSEMBLY

BACKGROUND OF THE INVENTION

1. Field of the Invention

The present invention relates to a vacuum booster assembly adapted for use in a vehicle brake system, and more particularly to a vacuum booster assembly the housing of which is constructed of front and rear shells of light weight sheet metal.

2. Discussion of the Background

To provide a light weight vacuum booster assembly, it is indispensable to lighten the housing for the booster assembly. On the other hand, sufficient rigidity and strength of the housing are required to resist a reaction force applied thereto in operation of the booster assembly. For such requirements, Japanese Patent Publication No. 58-101862 discloses a vacuum booster assembly which includes front and rear shells of synthetic resin each formed at its inner wall with a pair of sleeve-like projections and coupled to each other at their annular opening end portions, a power piston housed within the coupled shells and having a cylindrical portion axially slidably supported on the rear shell and a pressure receiving portion integral with the front end of the cylindrical portion, and a diaphragm member attached to the pressure receiving portion of the power piston and coupled over the cylindrical portion of the power piston at its inner peripheral rim, the diaphragm member being clamped at its outer peripheral rim between the annular opening end portions of the shells and clamped between the inner ends of the sleeve-like projections. In such an arrangement of the booster assembly, the front and rear shells are molded to form therein the sleeve-like projections, resulting in an increase in the manufacturing cost of the booster assembly. It is also difficult to ensure air-tightness at the outer peripheral rim of the diaphragm member.

SUMMARY OF THE INVENTION

It is, therefore, a primary object of the present invention to provide an improved vacuum booster assembly the housing of which is constructed of front and rear shells made of pressed sheet metal at a low cost and wherein air-tightness at the outer peripheral rim of the diaphragm member is reliably obtained in a relatively simple construction.

According to the present invention, the primary object is accomplished by providing a vacuum booster assembly which comprises a front shell made of pressed sheet metal and having an annular opening end portion, a rear shell made of pressed sheet metal and having an annular opening end portion coupled with the annular opening end portion of the front shell, a power piston housed within the coupled shells, the power piston having a cylindrical portion axially slidably supported on the rear shell and a pressure receiving portion secured to the front end of the cylindrical portion, the pressure receiving portion being formed with a pair of radial recesses, a diaphragm member attached to the pressure receiving portion of the power piston to subdivide the interior of the coupled shells into a vacuum or constant pressure chamber and a variable pressure chamber, the diaphragm member having an outer annular bead clamped between the annular opening end portions of the shells, an inner annular bead coupled over the cylindrical portion of the power piston, a flexible portion extending along the contour of the pressure receiving portion of the power piston, and a pair of support portions formed to correspond with the radial recesses of the pressure receiving portion of the power piston; a pair of support members attached to the support portions of the diaphragm member in such a manner to permit axial movement of the power piston; a pair of tie bars extending in parallel respectively across the front shell, the support member, the support portion of the diaphragm member and the rear shell and fastened at opposite ends thereof to the front and rear shells to clamp the support portions of the diaphragm member between the support members and the rear shell, and valve means assembled within the cylindrical portion of the power piston for selectively connect the variable pressure chamber to the constant pressure chamber or the atmospheric air in response to operation of the power piston.

BRIEF DESCRIPTION OF THE DRAWINGS

Additional objects, features and advantages of the present invention will be readily apparent from the following detailed description of a preferred embodiment thereof when considered with reference to the accompanying drawings, in which.

DESCRIPTION OF THE PREFERRED EMBODIMENT

Figure 1:
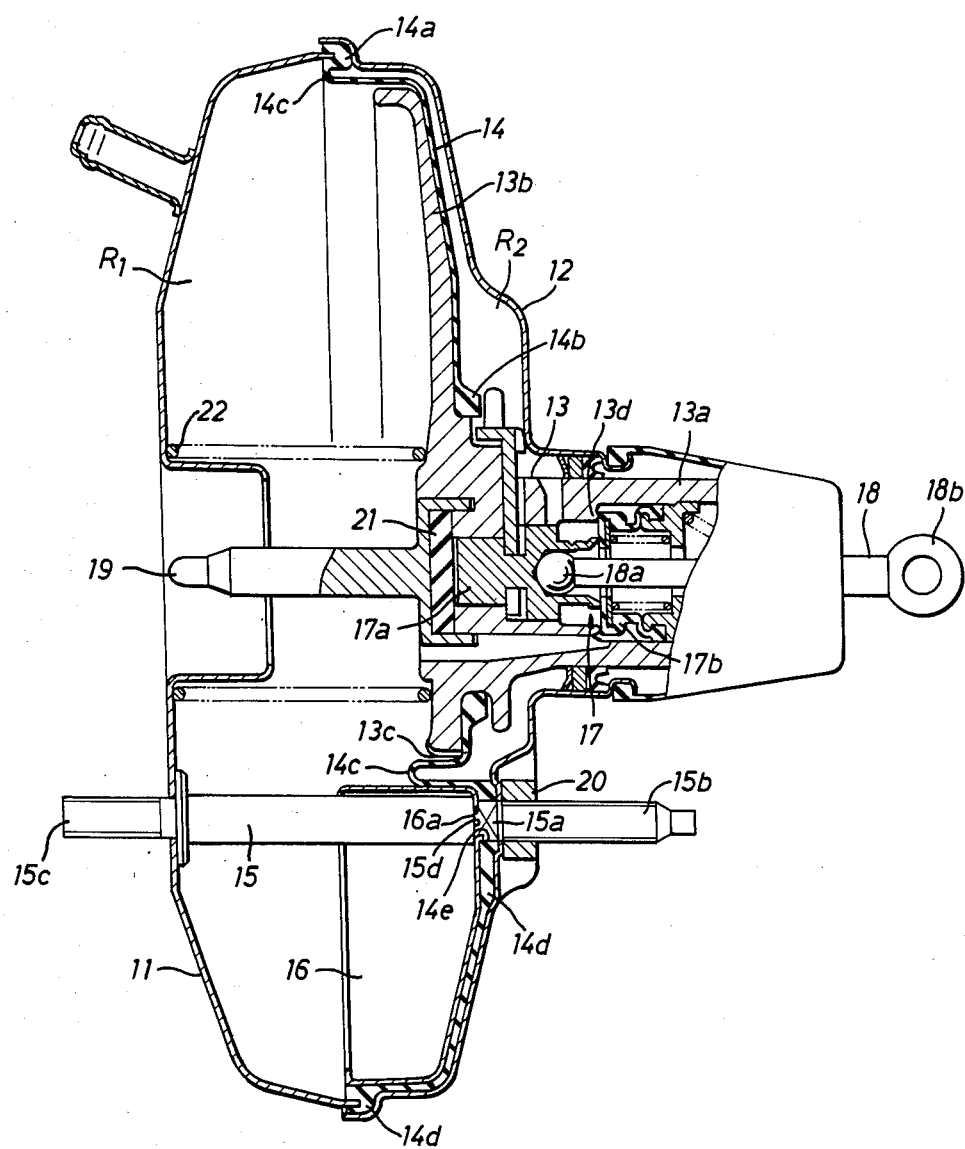
FIG. 1 is a sectional view of a vacuum booster assembly in accordance with the present invention.
Figure 2:
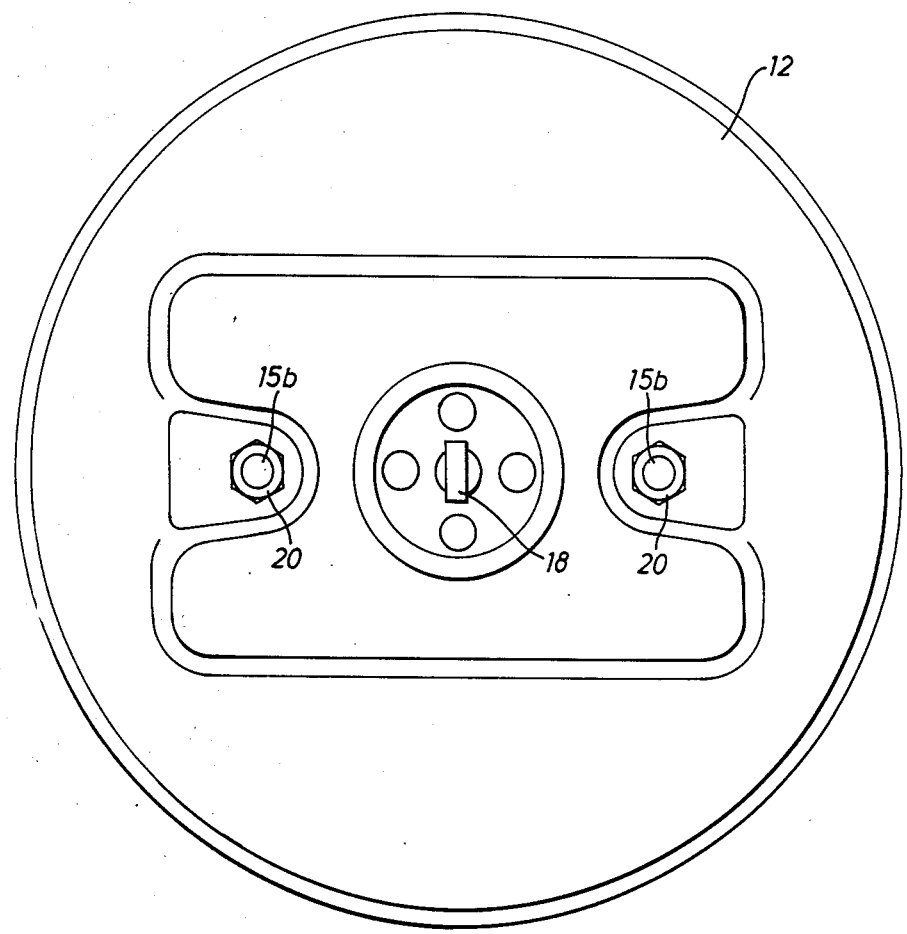
FIG. 2 is a rear view of the booster assembly shown in FIG. 1.
Figure 3:
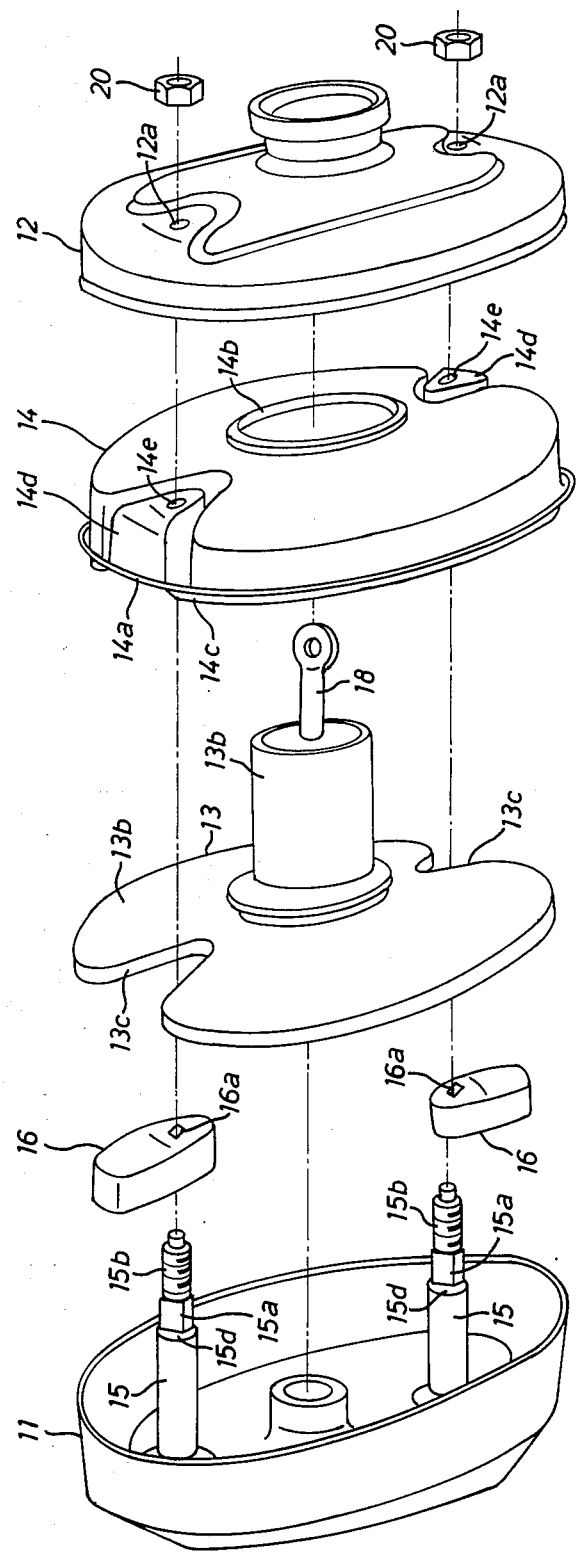
FIG. 3 is a perspective view illustrating the component parts of the booster assembly in its diassembled condition.

Referring now to the drawings, particularly in FIGS. 1 to 3, there is illustrated a vacuum booster assembly in accordance with the present invention which includes a front shell 11, a rear shell 12, a power piston 13, a diaphragm member 14, a pair of tie bars 15, a pair of cup-shaped support members 16, a valve assembly 17, an input rod 18 and an output rod 19. The front and rear shells 11 and 12 each are made of pressed sheet metal and formed with an annular opening end portion. The power piston 13 has a cylindrical portion 13a which is axially slidably supported within an inner cylindrical portion of rear shell 12. As can be well seen in FIG. 3, the power piston 13 is integrally formed at its front end with a pressure receiving portion 13b which is formed with a pair of radial recesses 13c. The pressure receiving portion 13b of power piston 13 is contained within the diaphragm member 14 which has an outer annular bead 14a hermetically clamped between the annular opening end portions of shells 11 and 12 and has an inner annular bead 14b hermetically coupled over the cylindrical portion 13a of power piston 13. In such an arrangement of the diaphragm member 14, the interior of the coupled shells 11 and 12 is subdivided into a vacuum or constant pressure chamber $R_1$ and a variable pressure chamber $R_2$. Furthermore, the diaphragm member 14 is formed with a flexible portion 14c extending along the contour of pressure receiving portion 13b of power piston 13 and is further formed with a pair of extruded support portions 14d which correspond with the radial recesses 13c of pressure receiving portion of power piston 13 to contain therein the support members 16. The support portions 14d of diaphragm member 14 each are formed with a through hole 14e which is engaged with opposite flat surfaces 15a of tie bar 15.

The tie bars 15 are secured in parallel to the inner wall of front shell 11 and extend outwardly respectively across a through hole 16a of support member 16, the through hole 14e of diaphragm member 14 and a through hole 12a of rear shell 12. Thus, the tie bars 15 are respectively fixed at one end portion thereof 15b to the rear shell 12 by means of a nut 20 threaded thereto and attached to a vehicle body structure (not shown). The opposite end portions 15c of tie bars 15 are respectively threaded for connection to a master cylinder (not shown). The support members 16 each are made of pressed sheet metal and coupled within the extruded support portion 14d of diaphragm member 14. Thus, the support members 16 are respectively fixed by engagement with a stepped portion 15d of tie bar 15 to clamp the support portions 14d of diaphragm member 14 between the support members 16 and the inner wall of rear shell 12.

The valve assembly 17 includes a valve plunger 17a assembled within the cylindrical portion 13a of power piston 13, and a spring loaded tubular valve body 17b assembled coaxially with the valve plunger 17a within the cylindrical portion 13a of power piston 13. The valve plunger 17a is connected to a spherical inner end 18a of input rod 18 which is operatively connected at its outer end 18b to a brake pedal (not shown). The cylindrical portion 13a of power piston 13 is formed therein with an annular valve seat 13d which cooperates in a usual manner with the tubular valve body 17b to selectively connect the variable pressure chamber $R_2$ to the constant pressure chamber $R_1$ or the atmospheric air in response to operation of the input rod 18. The output rod 19 is connected at its inner end to the power piston 13 through a cushion disc 21 of rubber and extends outwardly from the front shell 11 to be connected to the master cylinder. A compression coil spring 22 is engaged at one end thereof with the inner wall of front shell 11 to bias the power piston 13 rightward in the figure.

Figure 4:
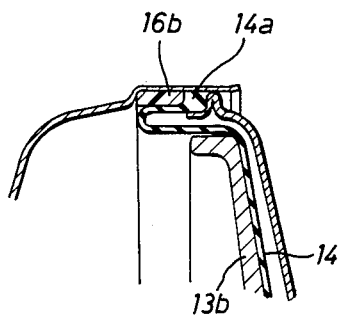
FIG. 4 is a sectional view illustrating partly a modification of the booster assembly.
Figure 4:
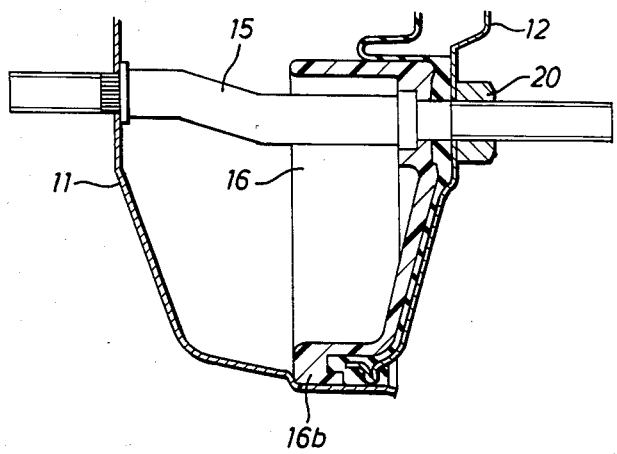

In operation of the vacuum booster assembly, the tie bars 15 act to directly receive a reaction force applied thereto from the master cylinder so as to prevent the coupled shells 11 and 12 from being damaged caused due to the reaction force. Thus, the front and rear shells 11 and 12 can be made of pressed sheet metal at a low cost. The air-tightness of diaphragm member 14 is reliably obtained because the diaphragm member 14 is clamped at its outer peripheral rim between the annular opening end portions of shells 11 and 12 and clamped at its support portions 14d between the rear shell 12 and the support members 16. Since the support members 16 are made of pressed sheet metal, the capacity of constant pressure chamber R1 can be enlarged to reduce the drop in vacuum pressure after operation of the booster. Alternatively, the support members 16 may be made of synthetic resin as is illustrated in FIG. 4. In such a case, it is desirable that the support members 16 each are formed with a connection ring 16b coupled with the outer annular bead 14a of diaphragm member 14. Furthermore, the tie bar 15 may be fixed at its other end to the front shell 11 substantially in the same manner as the fixture to the rear shell 12.

Although a specific embodiment of the invention has been shown and described, it is obvious that many modifications thereof are possible. The invention, therefore, is not intended to be restricted to the exact showing of the drawings and description thereof, but is considered to include reasonable and obvious equivalents.

What is claimed is:

1. A vacuum booster assembly, comprising:
   a front shell made of pressed sheet metal and having an annular opening end portion;
   a rear shell made of pressed sheet metal and having an annular opening end portion coupled with the annular opening end portion of said front shell;
   a power piston housed within said coupled shells, said power piston having a cylindrical portion axially slidably supported on said rear shell and a pressure receiving portion secured to the front end of the cylindrical portion, the pressure receiving portion being formed with a pair of radial recesses;
   a diaphragm member attached to the pressure receiving portion of said power piston to subdivide the interior of said shells when coupled into a constant pressure chamber and a variable pressure chamber, said diaphragm member having an outer annular bead clamped between the annular opening end portions of said shells, an inner annular bead coupled over the cylindrical portion of said power piston, a flexible portion extending along the contour of the pressure receiving portion of said power piston, and a pair of radially extending, extruded support portions formed to correspond with the radial recesses of the pressure receiving portion of said power piston;
   a pair of support members having a through hole therein and positioned within the support portions of said diaphragm member in such a manner as to permit axial movement of said power piston;
   a pair of tie bars extending in parallel respectively across said front shell, through said through hole in said support member, across the support portion of said diaphragm member and said rear shell and fastened at opposite ends thereof to said front and rear shells to clamp the support portions of said diaphragm member between said support members and said rear shell, and
   valve means assembled within the cylindrical portion of said power piston for selectively connecting said variable pressure chamber to said constant pressure chamber or atmospheric air in response to operation of said power piston.

2. A vacuum booster assembly as claimed in claim 1, wherein said support members are a pair of cup-shaped members, and the support portions of said diaphragm member each are extruded to contain therein said cup-shaped support members.

3. A vacuum booster assembly as claimed in claim 2, wherein said cup-shaped support members comprise pressed sheet metal support members.

4. A vacuum booster assembly as claimed in claim 2, wherein said cup-shaped support members comprise synthetic resin support members and further comprising a connection ring coupled with the outer annular bead of said diaphragm member.

* * * * *